Feb. 14, 1933.  H. HAHN  1,897,756
AEROPLANE
Filed Feb. 18, 1932   2 Sheets-Sheet 1

INVENTOR-
Henry Hahn
BY
his ATTORNEYS

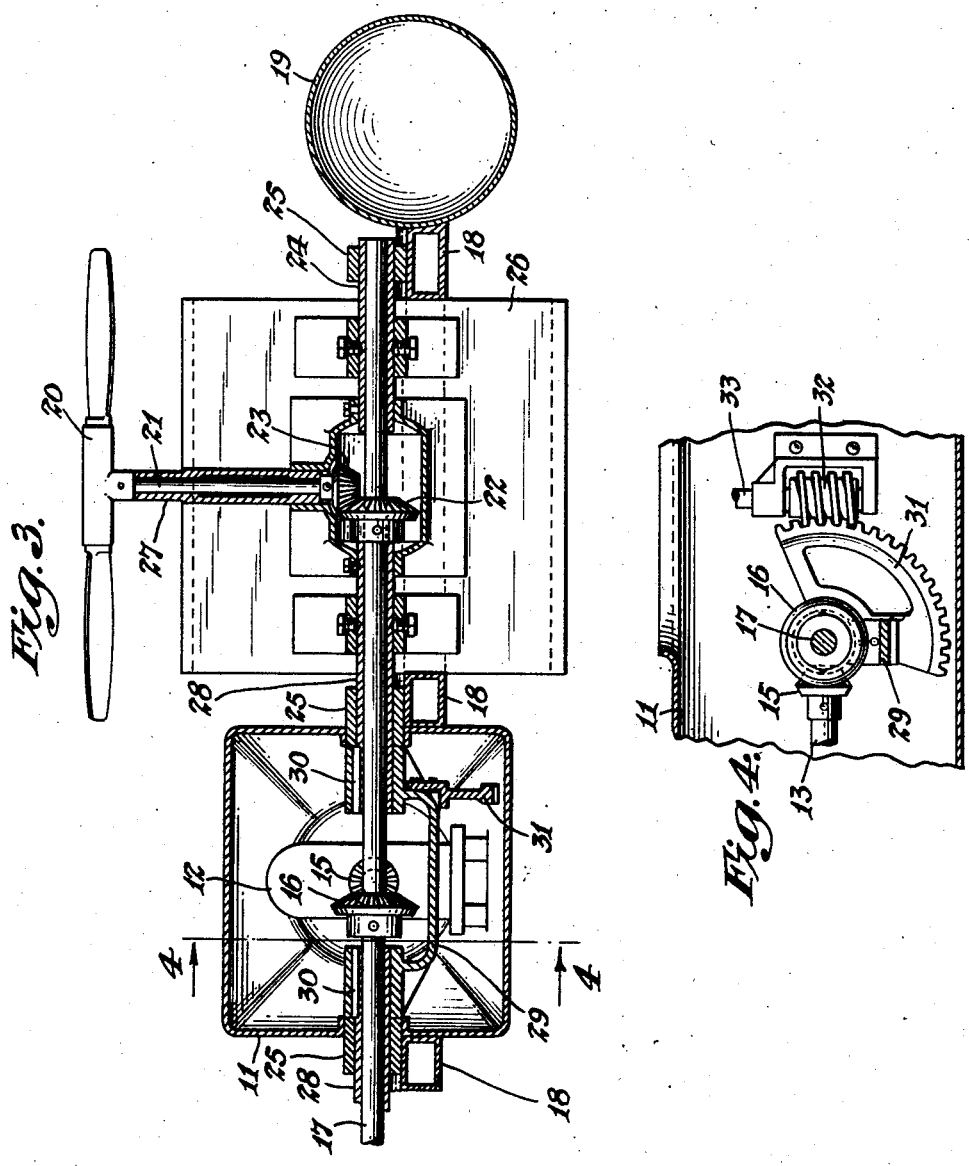

Patented Feb. 14, 1933

1,897,756

UNITED STATES PATENT OFFICE

HENRY HAHN, OF CEDARHURST, NEW YORK

AEROPLANE

Application filed February 18, 1932. Serial No. 593,750.

The present invention relates to dirigible aircraft and embodies, more specifically, an improved form of dirigible craft combining the characteristics of lighter than air craft as well as heavier than air craft. More particularly, the invention embodies primarily a heavier than air craft provided with propelling mechanism which may be adjusted to facilitate the lifting of the craft in combination with means containing a buoyant gas for exerting a normal lifting force upon the craft.

In applicant's copending application Ser. No. 491,659 for aeroplanes filed October 28, 1930, an aeroplane construction is described wherein auxiliary propellers are so mounted that they may be adjusted between the horizontal and vertical axis whereby the tractive force thereof may be exerted in any direction between the horizontal and vertical. The present invention is an improvement on the construction set forth in the above identified prior application and an object thereof is to provide an aeroplane having its normal buoyancy increased by the provision of compartments for containing a lighter than air gas.

A further object of the invention is to provide a plane of the above character in combination with adjustable mechanical means for increasing the forward speed of the plane or its lifting power.

Further objects not specifically enumerated above, will be apparent as the invention is described in greater detail in connection with the accompanying drawings, wherein:

Figure 3 is a view in section, taken on line 3—3 of Figure 1, and looking in the direction of the arrows.

Figure 4 is a view in section, taken on line 4—4 of Figure 3, and looking in the direction of the arrows.

Figure 1:
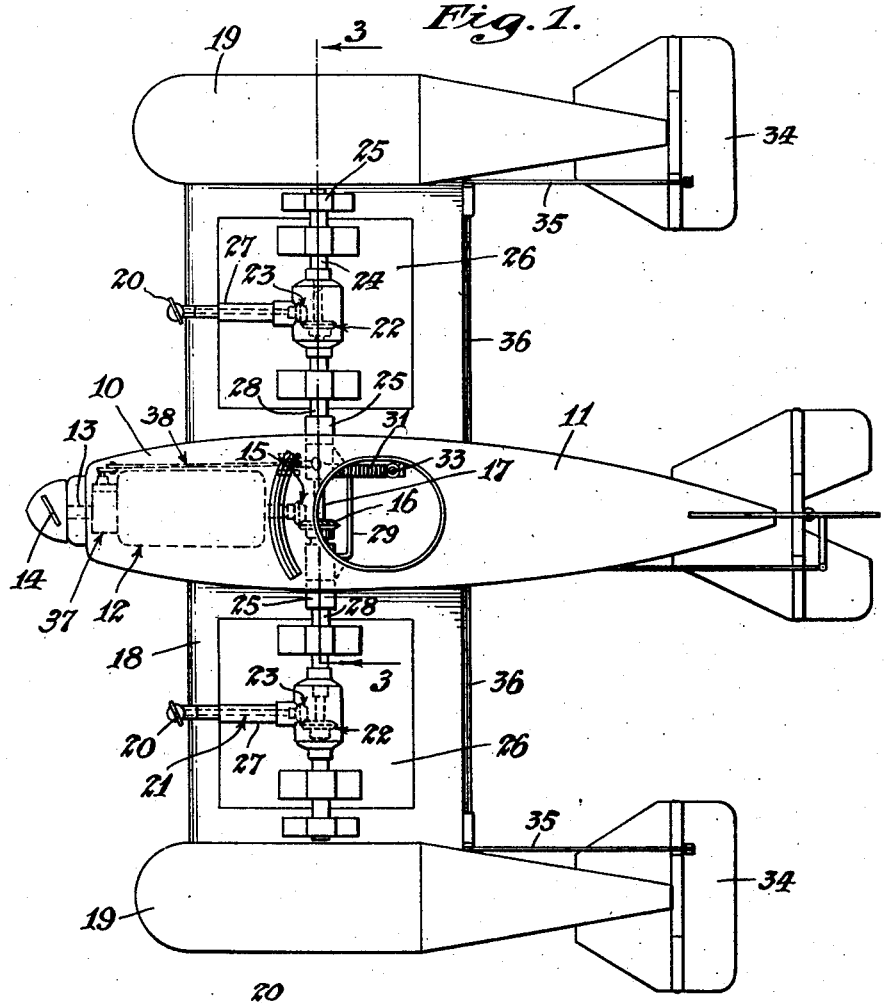
Figure 1 is a plan view of an aeroplane constructed in accordance with the present invention.
Figure 2:
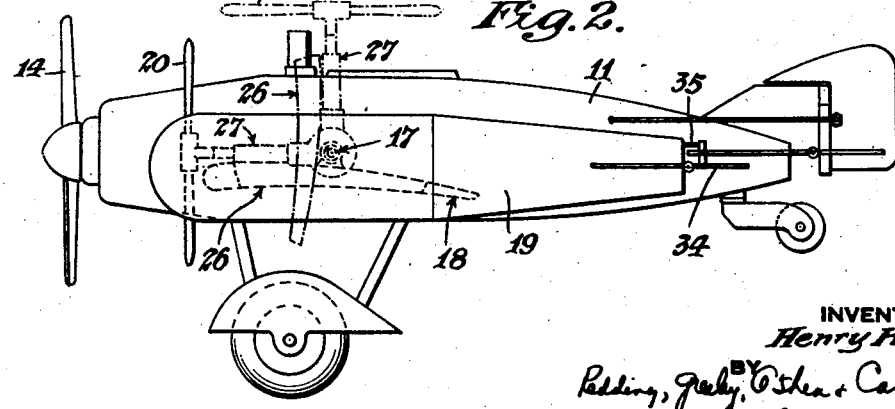
Figure 2 is a view in side elevation, showing the plane of Figure 1.

Referring to the above drawings, the fuselage of an aeroplane is shown at 10, the fuselage having, in the after portion thereof, a compartment 11 in which helium or other lighter than air gas may be confined. The forward end of the fuselage may contain the engine 12 and other suitable controlling mechanism, the details of which need not be set forth herein. The engine power shaft 13 extends forwardly to drive a propeller 14 and rearwardly to mount a driving bevel pinion 15. Bevel pinion 15 engages a cooperating bevel gear 16 which is secured to a transverse power shaft 17 which extends through the wing structure 18.

The wings 18, upon opposite sides of the fuselage 10 carry containers 19 within which helium or other lighter than air gas may be stored. It will be apparent that the wing structure of the plane itself may be adapted to receive the helium containers to thus supplement the normal lifting power of the plane.

Adjustable side propellers 20 are mounted upon power shafts 21 which are driven from the power shaft 17 through bevel gears 22 and bevel pinion 23.

The power shaft 17 is journaled within sleeves 24 and 28 which are journaled in bearings 25 carried by the wing structure 18 and wing sections 26 are secured to the sleeves 24 and 28 and are provided with sleeves 27 within which the power shafts 21 are journaled. The sleeves 28 are splined to a yoke 29 at 30. Yoke 29 is provided with a gear sector 31 which is engaged by a worm 32, mounted on a shaft 33. It will thus be seen that rotation of shaft 33 causes the wing sections 26 to be moved about the axis of power shaft 17. These wing sections may thus be tilted to a horizontal or a vertical position and the tractive power of the propeller 20 may thus be exerted in any desired direction to supplement the lifting power of the plane.

Suitable control mechanism may be provided on the after portion of the fuselage, in accordance with standard aeroplane practice and the supplemental lifting bags 19 may likewise be provided with ailerons 34 which may be actuated by links 35 and shafts 36 in such fashion that one may be deflected upwardly while the other is deflected downwardly to assist in controlling the plane.

To facilitate the hovering of the craft without forward motion when the auxiliary propellers 20 are elevated, a clutch 37 is provided to de-clutch propeller 14, a suitable controlling mechanism 38 being provided to actuate the clutch 37.

From the foregoing, it will be seen that a dirigible aircraft has been provided with the usual propeller and driving mechanism, this mechanism being supplemented by auxiliary propellers which may be adjusted to exert their power in a forward direction or to assist the lifting power of the plane. In combination with these auxiliary propellers, supplemental lifting means is provided in the form of helium or other lighter than air gas bags which may additionally serve as a mounting means for certain of the control mechanism of the plane.

While the invention has been described with specific reference to the accompanying drawings, it is not to be limited, save as defined in the appended claim.

I claim as my invention:

In an aeroplane, in combination with a fuselage, wings extending laterally from said fuselage and having openings within the perimeters of the respective wings, independent wing sections, sleeves journaled in the wings and secured to the sections to mount the same in the respective openings, said wing sections constituting continuations of the wings, propellers journaled on the sections, a power shaft journaled in certain of the sleeves, means in the fuselage to supply power to the power shaft, containers on the ends of the wings containing a lighter than air gas, and control mechanism on the containers.

This specification signed this 17th day of February A. D. 1932.

HENRY HAHN.